United States Patent Office 3,238,438
Patented Mar. 1, 1966

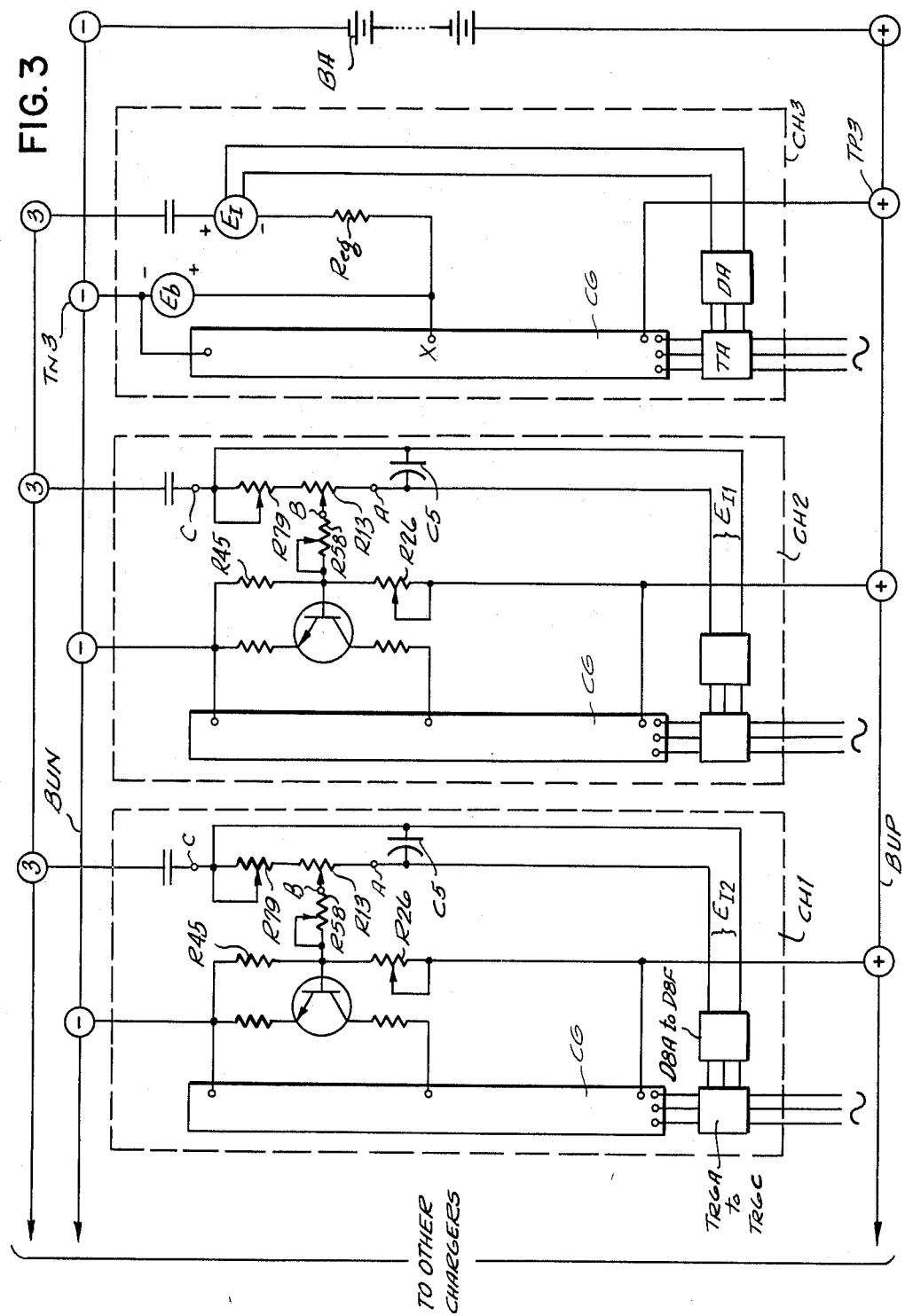

3,238,438
LOAD CURRENT DISTRIBUTING CIRCUIT FOR POWER SUPPLIES CONNECTED IN PARALLEL
Earl C. Rhyne, Jr., Millis, Mass., assignor to The Warren Manufacturing Company, Inc., Littleton, Mass., a corporation of Massachusetts
Filed Aug. 15, 1962, Ser. No. 217,200
3 Claims. (Cl. 320—56)

My invention relates to load-current distributing circuits for parallel connected power supplies and particularly to circuits for constraining a controllable regulated power supply in a telephone-battery charger to furnish current in a predetermined proportion to another parallel-connected charger energizing the same battery.

In telephone exchange systems, where one battery charger does not suffice to furnish sufficient current, it is conventional to connect a plurality of regulated power supplies in parallel for jointly providing enough current to maintain the charge on a bank of batteries energizing the telephone exchange system. It is desirable, for avoiding excessive expenditure on equipment, to use the least number of chargers for the particular current load. However, unless the proportion of current furnished by each power supply can be regulated, for example to share the load equally, it may cause some units to be overloaded (i.e. at current-limit) while others are carrying little or no load.

For example, where the load draws 1.8 times the current capable of being furnished by one power supply, unless two such power supplies can be constrained to share the load equally, it may cause one of the power supplies to carry 125% of its rated load current while a second carries only 55% rated load current. Typically, such paralleled units are characterized by current-limiting at an overload value, such as 125%. Continuous operation at 125% may not immediately damage the units, but will reduce component life.

Thus an object of my invention is to provide a circuit for constraining a controllable regulated power supply to furnish current in the most advantageous proportion with another supply connected in parallel thereto.

Another object of my invention is to provide a circuit for a number of power supplies which will constrain each other, as well as an additional power supply to furnish current to a load in a predetermined proportion.

Still another object of my invention is to provide a circuit constraining controllable regulated power supplies to furnish current equally to a common load.

According to a feature of my invention I provide in each power supply, impedance means indicating as a voltage, the current being furnished by the power supply. I mutually connect the impedance means in each power supply so as to compare their voltages, and in response to the variation of voltage in the impedance means, I vary the regulation of one of the power supplies to thereby constrain the supplies to share the load current.

These features and advantages of my invention will become apparent from the following detailed description of circuits embodying the features of the invention when considered in connection with the accompanying drawings wherein:

FIG. 3 illustrates by way of a circuit diagram three chargers, two of which when connected with each other have control circuits embodying features of the invention.

Figure 1:
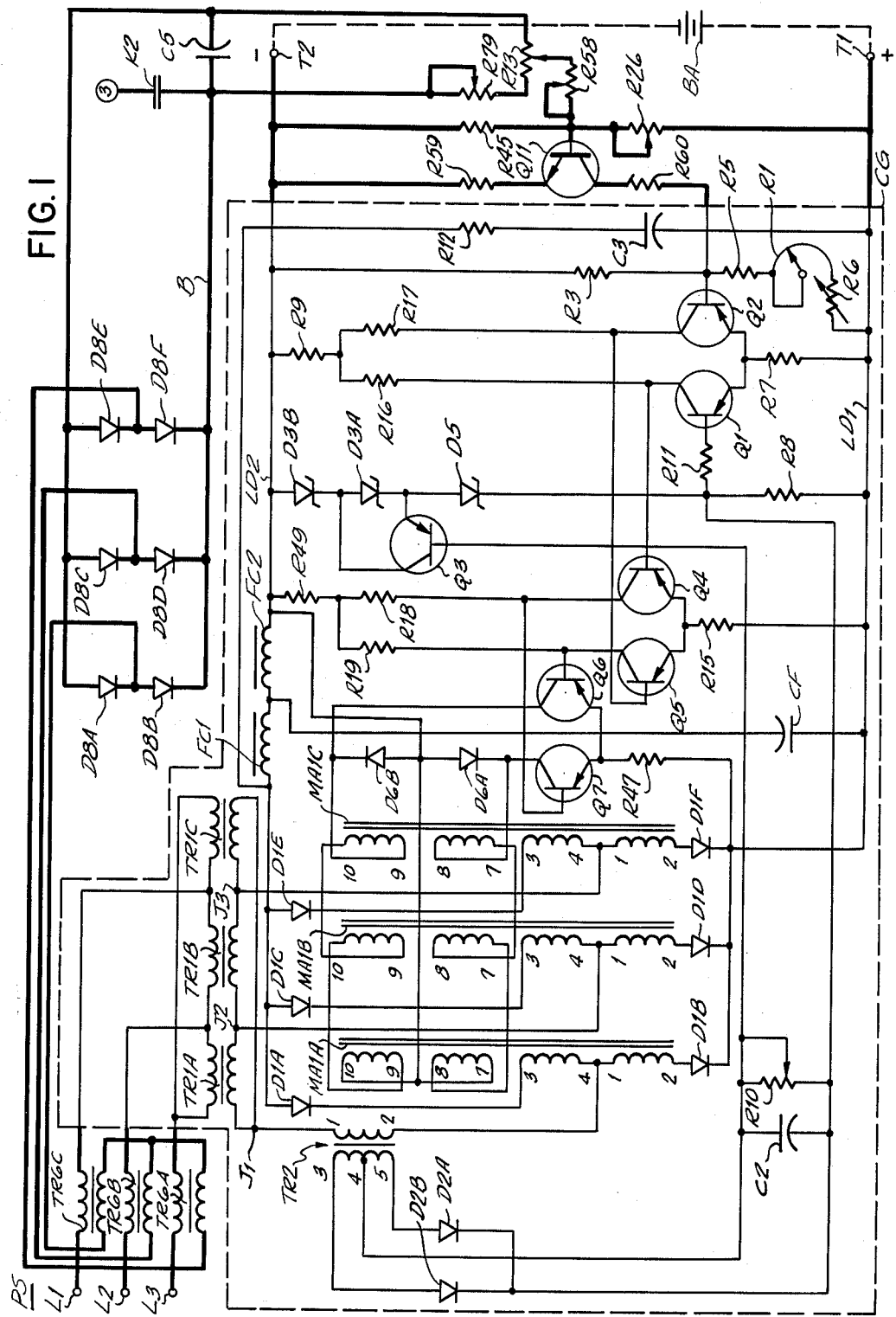
FIG. 1 is a schematic diagram of a control circuit in a power supply or charger embodying features of my invention.

In FIG. 1 the portion of the circuit pertaining to load sharing appears in heavy lines and serves to control the regulation of the charging generator CG appearing in lighter lines within the broken lines. The charging generator CG is essentially described in my patent application Serial No. 168,911, filed January 26, 1962. The generator CG operates when power is received through terminals L1, L2, L3 forming a three-phase alternating voltage source not further shown. The generator CG supplies a direct voltage between a positive output terminal T1 and a negative output terminal T2 and will be more fully discussed.

The terminals T1, T2 are adapted for connection across a load which is generally referred to as load L but specifically represents the battery BA. Buses to be more particularly mentioned may be utilized to connect the terminals T1, T2 to the battery.

Three power transformers TR1A, TR1B and TR1C possess delta-connected primary windings inductively interlinked with delta-connected secondary windings and step down the voltage of the source PS to a predetermined level measured across the mutual junctions J1, J2 and J3 of the secondary windings. Three corresponding forward branches of a three-phase bridge rectifying network may be traced respectively from the junctions J1, J2, J3 through three separate variable-impedance windings 1, 2 of three magnetic amplifiers MA1A, MA1B, MA1C respectively, through three separate diodes D1B, D1D, D1F respectively, to the line LD1 and to the + terminal T1. The circuit from junction J1 to windings 1, 2 of magnetic amplifier MA1A also passes through the primary windings 1, 2 of an auxiliary current transformer TR2. A return branch of the three-phase bridge rectifying network may be traced from a — terminal T2 through a line LD2 and through two series-connected filter chokes FC2, FC1. The return branch then splits into three branches and can be traced through three separate diodes D1A, D1C, D1E respectively, through three separate variable impedance windings 3, 4 of magnetic amplifiers MA1A, MA1B, MA1C respectively, and back to the respective junctions J1, J2, J3. A filter capacitor CF connects from the junction of chokes FC1, FC2 to the common lead of diodes D1B, D1D, D1F. In the following discussion the designations TR1 and MA1 serve to respectively indicate the transformers TR1A, TR1B, TR1C collectively and magnetic amplifiers MA1A, MA1B and MA1C collectively. The magnetic amplifiers MA1 each possess a pair of control windings 7, 8 and 9, 10 which vary the flux in the saturable cores of the magnetic amplifiers.

Generally the currents from the respective junctions of the delta-connected secondaries of the transformer TR1 all pass through the impedance windings 1, 2 and 3, 4 in the respective magnetic amplifiers MA1. The impedance of the respective windings 1, 2 and 3, 4 in magnetic amplifiers MA1 can thus control the currents passing through the current rectifying diodes D1B, D1D and D1F where rectification occurs, to the positive output terminal T1. Return current from the negative terminal T2 of the output passes back through the chokes FC2, FC1 to the three diodes D1A, D1C and D1E which are respectively connected to the windings 3, 4 of the magnetic amplifiers MA1A, MA1B and MA1C. At the start of each conducting half cycle in each of the three phases of current flow through the series-connected corresponding diodes D1A to D1F the magnetic amplifiers MA1 are unsaturated, and the impedance exhibited by the windings 1, 2 and 3, 4 is high. At this time almost all the voltage from the respective junctions J1 to J3 is impressed across the high impedance in windings 1, 2 and 3, 4 and only negligible voltage appears across the load L. Once during each conducting half cycle of each phase the currents through the windings 1, 2 and 3, 4 increase the flux in the core from its starting level until the core of the magnetic amplifier abruptly saturates; it being of course understood that the cores of the magnetic amplifiers MA1 are readily saturable. The angle in each conducting half cycle of each of the three phases at which saturation occurs is designated the saturation angle. Saturation of the individual cores in magnetic amplifiers MA1 reduces the impedance of the corresponding windings 1, 2 and 3, 4 to a negligible value so as to impress most of the voltage from the transformers TR1 across the load L.

The angle, hence the time, over which the voltage is impressed across the terminals T1, T2 (i.e. load L or battery BA) during each half cycle in each of the three rectifying phases determines the average value of the voltage across the load. This average value of voltage can be controlled by varying the time within each half cycle in each rectifying phase during which the voltages are impressed across the load, hence by varying the time during which the magnetic amplifiers are saturated, and hence by controlling the saturation angle. An additional flux through the cores of the individual magnetic amplifiers MA1 will retard or accelerate the time of saturation within each conducting half cycle of each phase. Such a control flux is obtained by varying the currents through the windings 7, 8 and 9, 10 in the magnetic amplifiers MA1. The latter windings are arranged to have opposing effects in each magnetic amplifier. Thereby equal currents in the windings 7, 8 and 9, 10 produce zero control flux and a saturation angle of preferably 90°. Increasing the current in one winding relative to the other opposing winding reduces the saturation angle thereby increasing the time in each half cycle of each phase during which saturation occurs; thereby increasing the average voltage across the load. On the other hand, increasing the current in the other winding relative to the first increases the saturation angle and decreases the time during which saturation occurs in each half cycle of each phase; thereby decreasing the load voltage. Thus, depending upon the direction of current flow and the winding direction of the control windings 7, 8 and 9, 10 direct current through these control windings will increase and decrease the saturation angle of the core.

According to FIG. 1, an increase in current through windings 7, 8 and a decrease in current through windings 9, 10 tends to increase the saturation angle thereby decreasing the average voltage across the load L. The circuits controlling the currents through the last-mentioned sets of control windings essentially consist of an output-voltage sensing circuit or stage and a magnetic-amplifier driving circuit. The sensing stage comprises a pair of differential-amplifier-connected transistors Q1 and Q2 and the associated voltage supply circuits. A voltage dropping resistor R9 connects the negative lead LD2 of the power source to two resistors R16, R17 which energize the collectors of transistors Q1 and Q2 respectively. A common-emitter resistor R7 joins the emitters of the last-named transistors to the positive lead LD1 of the source. A temperature-compensating resistor R11 electrically joins the base of transistor Q1 to a constant-voltage-maintaining circuit essentially comprised of a current supply resistor R8 connected from the positive lead LD1 of the power circuit to the resistor R11, and three serially connected Zener diodes D5, D3A and D3B poled as shown and connected to the negative lead LD2. The diode D5 connects directly to the resistor R11 and exhibits a constant voltage drop of 5 volts over its significant range of operating currents, the current values being determined by the resistor R8. The diodes D3A and D3B, energized from the negative lead of the power source each exhibit a voltage drop of 10 volts over their significant range of currents. The resistance of the resistor R8 is such that it causes the last-mentioned diodes D5, D3A and D3B to operate within their significant current ranges. Therefore, the voltage drop from the negative lead of the power source to the resistor R11 remains substantially constant. The base of the transistor Q2 receives biasing current from an output-voltage-sensing voltage divider comprised of resistors R3, R5, R1 and R6 at the junction of resistors R3 and R5, the functions of the resistors R1 and R6 being explained below.

When the D.-C. output voltage rises, the voltage across the resistor R3 increases relative to the Zener voltage, effecting a more positive voltage at the base of transistor Q2. When the base of transistor Q2 becomes more positive relative to its emitter, the collector of transistor Q2 becomes more negative and the collector of transistor Q1 becomes more positive.

The collectors of transistors Q1 and Q2 connect respectively to the bases of differential-amplifier connected transistors Q4 and Q5 which constitute part of the magnetic-amplifier drive circut. The signal of more negative potential on one base than the other will render the corresponding collector more positive and the companion collector more negative. A resistor R15 serves as a common emitter resistor for each of the transistors Q4 and Q5. A voltage-dropping resistor R49 joins the negative lead LD2 of the power circuit through a pair of collector resistors R18 and R19 which electrically connect the collectors of the respective transistors Q4 and Q5. Direct lines conductively join the collectors of transistors Q4 and Q5 to the base of transistors Q7 and Q6 respectively, the latter transistors again being connected in the potential-difference configuration of Q4, Q5. A common emitter resistor R47 connects the respective emitters of transistors Q6 and Q7 to the positive lead LD1 while the collectors of the latter transistors receive current from the negative lead LD2 of the power source through windings 9, 10 and 7, 8 respectively of each of the magnetic amplifiers MA1. The windings 9, 10 are each connected in series with each other and affect the cores of amplifiers MA1 in a like sense. The windings 7, 8 are also connected in series with each other and, as stated, effect a flux in the respective cores of transformer MA1 in a sense opposite to that caused by windings 9, 10. The series-connected windings 7, 8 and 9, 10 connect the negative lead LD2 of the power source to the respective collectors of transistors Q7 and Q6. The currents in the windings 7, 8 and 9, 10, as stated, controls the saturation angle in windings 1, 2 and 3, 4.

In closed-loop operation a voltage differential at the bases of transistors Q1 and Q2, caused by the load-voltage-proportional potential across resistor R3 relative to the voltage across diodes D3A, D3B, D5, effects a voltage differential between the bases of transistors Q4, Q5 and Q6, Q7. The latter results in a current differential in windings 7, 8 and 9, 10 so as to set a particular saturation angle corresponding to the voltage differential at the bases of transistors Q1, Q2. Preferably for equal base voltage the saturation angle in magnetic amplifiers MA1 for the individual half cycles in each of the three phases remains at a preset angle as required to obtain equilibrium voltage.

In a voltage regulating mode when the D.-C. output voltage at terminals T1, T2 lowers from the predetermined steady state value as the result of an increased load for example, the voltage across resistor R3 becomes less, upsetting the previously existing equilibrium voltage differential at the bases of transistors Q1 and Q2. Under these conditions, the voltage at the base of transistor Q2 becomes more negative thereby rendering the voltage at the collector of transistor Q2 more positive. The more positive voltage on the collector of transistor Q2 makes the voltage at the base of transistor Q5 more positive and the voltage at the collector thereof more negative. This results in a more positive voltage at the collector of transistor Q6 and increased current through the emitter-collector circuit of transistor Q6. As the collector of transistor Q2 has become more positive, the collector of transistor Q5 more negative and the collector of transistor Q6 more positive, the collector of transistor Q1 has become more negative, the collector of transistor Q4 more positive and the collector of transistor Q7 more negative. Thus an increase in the current through windings 9, 10 of magnetic amplifiers MA1 and a decrease in windings 7, 8 obtains. This increase in current advances the saturation angle of the cores in magnetic amplifiers MA1 for each half cycle in each phase. This in turn increases the voltage across the load L sufficiently to restore the voltage at the base of transistor Q2 to the previously existing equilibrium differential.

If the output voltage departs from the predetermined value in an upward direction, the voltage across the resistor R3 increases and the voltage at the base of transistor Q2 becomes more positive relative to the voltage at the base of transistor Q1. The opposite collectors in the varying transistors are now rendered more positive and negative, as was the case for low output voltage. The current through the windings 7, 8 then increases as the current through the windings 9, 10 decreases thereby retarding the saturation angle within each half cycle of each phase in the rectifier. The voltage across resistor R3 is thereby lowered until an equilibrium condition prevails and the desired voltage across the load is obtained.

To adjust the level of the output voltage to a second predetermined value, the charging generator employs the resistor R1, which is an adjustable rheostat, and the resistor R6, which is an adjustable resistor. Raising the resistance of the resistor R1 decreases the current through the resistor R3 and makes the voltage at the base of transistor Q2 more negative or less positive. This causes the collector of transistor Q2 to become more positive and eventually advances the saturation angle to effect an increase in the output voltage. The latter increase results in an increase in the current through resistor R3 and the base of transistor Q2 is shifted to a new equilibrium voltage corresponding closely to the prior voltage differential. This increase in output voltage was accomplished without changing the voltage of the bases of transistors Q1 and Q2 relative to the negative lead LD2, by virtue of diodes D3A, D3B, D5. The emitters of the last-mentioned transistors would have become more positive relative to the bases if the current increase occasioned thereby through the transistors as well as the emitter resistor R7 did not occur. This increased current causes the emitter potentials to approach the voltage of the collectors as determined by D3A, D3B, D5 and commensurate with the respective base potentials. Thus a rise in load voltage due to a change in the value of R1, or to a voltage surge does not appreciably raise the collector-emitter or collector-base voltage in transistor Q1, Q2 but harmlessly raises the voltage across resistor R7. This is an important advantage in the circuits embodying the present invention. If the voltage of the bases in transistors Q1 and Q2 were held at a constant potential relative to the positive leads of the present circuit, upward adjustment of the output voltage by changing of the resistor R1 or R6 or by a voltage surge would substantially increase the voltage across the collector-emitter circuits of the transistors. Thus all of the increase in the output voltage would then appear in the collectors of the regulating transistors. In such cases, the voltage applied to the collector of the transistors through the combination of surge or increase in the output voltage may become greater than the voltage that the transistor can tolerate and cause shorting of the transistor base-to-collector diode junction. However, in the circuit according to FIG. 1, the regulated direct-voltage output may be adjusted upward or downward without effecting the voltage between the base of the transistors and the negative lead LD2, or the collector of the transistors. The sum of the currents in the emitter resistor R7 serves to lower or raise the potential of the emitters to compensate for the rise or fall of the output voltage.

A circuit of the type described may safely handle an incremental voltage rise of 100%. Such a rise extends well beyond the capabilities of many power transistors and would normally impose upon them severe limitations which would not permit sustaining of additional surges.

In circuits not employing the biasing described in FIG. 1, a change of 100% for a nominal output, would impose severe heating upon the regulating transistors because the increase in voltage at the collector is accompanied by heating of the collector.

In addition to the voltage across resistor R7 increasing when the output voltage rises, the voltages across resistors R9, R16 and R17 increase in direct proportion to the increase in current through resistor R7. This effect limits the practical value to which the output voltage may be increased, becauses if the output voltage exceeded the practical maximum value, the transistor Q1 would saturate. Saturation of this transistor effectively eliminates the regulating action of the circuit in FIG. 1 but results in no damage to the transistors and represents a safe self-limiting feature. For example, where the input voltage exhibits a surge two or three times the normal D.-C. voltage, the voltage across resistor R3 increases as previously described causing transistor Q2 to decrease conduction and Q1 to increase conduction. The off transistor Q2 then sustains a voltage from base to collector that can be less, even with the surge, than the combined Zener voltage. The voltage across the emitter-collector circuit of the off transistor Q2 substantially equals the current that is sustained in the surges through resistor R7 multiplied by the value of resistor R16.

For all practical purposes this safely allows the circuit to sustain over-voltages from the source of up to several hundred volts without damage, for example three or four hundred volts for a nominal 130 volt supply. The collector voltages of transistor Q1 and Q2 operate in a range of values limited by the combined Zener voltages even under surge conditions thereby permitting operation of low-voltage transistors and high-voltage D.-C. circuits. Essentially the voltage surges are converted into current which the transistors can sustain providing they are completely turned on during these surges. For example, a typical transistor operating at a 1 ampere steady-state value can withstand 12 to 20 amperes for surge conditions if it is fully turned on. However, such a transistor partly turned off, or in its active power-amplifying state could not withstand this type of current surge.

Thus far the description of generator CG has limited itself to its voltage-regulating aspects while ignoring certain parts of the circuit. The circuit of FIG. 1 accomplishes current limiting by connecting the collector-emitter circuit of a transistor Q3 across the ten volt Zener diode D3A, the emitter thereof connecting to the positive end of the Zener diode. The base of transistor Q3 receives biasing current from the negative terminal of an auxiliary full-wave rectified power supply which receives alternating current from the secondary winding 3, 4, 5 of the transformer TR2.

This conventional rectifying circuit comprises rectifying diodes D2A and D2B connected for full-wave rectification to the extreme terminals 3 and 5 of the secondary winding of transformer TR2 and to each other to form a positive lead, a negative lead wire connected to the center tap 4 of the last-named winding, and a filter capacitor C2. A variable resistor R10 connected across the capacitor C2, possesses a negative wiper or armature and electrically joined to the base of transistor Q3, and a positive stator end joined to the positive side of the diode D5.

This portion of the circuit operates as follows. The resistor R10 maintains an adjustment to bias the base of transistor Q3 to a cut-off condition whereby the transistor Q3 has no influence on the circuit of generator CG in the voltage-regulating mode. The current transforme TR2 supplies a current-proportional signal to rectifiers D2A and D2B, which rectifiers then produce a D.-C. signal across resistor R10. Because the positive stator end of the resistor R10 connects to a point which is 5 volts more positive than the emitter potential of transistor Q3, no current flows through resistor R10 when no load current flows. Thus the base of transistor Q3 dwells at a potential 5 volts more positive than the emitter of P-N-P transistor Q3, as determined by the Zener voltage of the diode D5. In this condition transistor Q3 is completely cut off and does not influence Zener diode D3A. When the resistance of the load is finite and begins to draw current, the D.-C. voltage across resistor R10 increases, and the base of transistor Q3 becomes more negative. When the load resistance is low enough and the voltage across resistor R10 equals the voltage across the Zener diode voltage D5, the emitter-collector circuit of transistor Q3 conducts and diverts current from Zener diode D3A. When enough current is diverted from the latter diode, the diode voltage across the Zener diode D5 decreases and results in a smaller reference voltage. Thereby the Zener-dependent voltage regulating system operates to maintain a lower output voltage, reducing slightly the line current or load current at a predetermined current value by increasing the magnetic amplifier impedance. In FIG. 1 the current begins to limit at 125% of the full-load current.

At each incremental reduction in the load impedance tending to increase the load current, the transistor Q3 increases the saturation angle in magnetic amplifiers MA1, lowers the output voltage to prevent the attempted increase in load current until transistor Q3 saturates and the Zener diode D3A is completely shorted. The system then continues to regulate at a voltage determined by Zener diodes D3B and D5 only. The increase in current therefore effectively shorts out the Zener diode D3A and lowers the reference voltage of the system causing the output voltage to lower.

As load current in FIG. 1 increases from zero to 125% of full-load, the output or load voltage remains substantially constant. At 125% of full load current the load voltage drops abruptly to another constant value.

In FIG. 1 three current transformers TR6A, TR6B, TR6C having their respective primaries connected in series with the lines leading from terminals L1, L2, L3 possess corresponding secondaries connected in three-phase Y arrangement. The primary windings of TR6A, TR6B, TR6C connect respectively in series with lines L1 to L3 energizing the generator CG so as to measure the current flowing into the equipment. In particular the primary windings of TR6A, TR6B, TR6C measure the current in the primary windings of transformers TR1A, TR1B and TR1C. The secondaries of transformers TR1A, TR1B, TR1C are delta connected and provide A.C. power for the charger generator CG.

The output of transformer secondaries in current transformers TR6A, TR6B and TR6C are rectified by a three-phase full-wave bridge rectifier arrangement including diodes D8A through D8F. A capacitor C5 filters the direct current output of the three-phase rectifier system, which output then appears across adjustable resistor R79 in series with potentiometer R13. The voltage developed across R13, R79 is proportional to the load current supplied by the charger CG, because current transformers TR6A, TR6B and TR6C are directly in series with the power lead of the charger coming from line L1, L2 and L3 and the input current of the charger is proportional to its output current. The positive output side of these two series resistors R13, R79 is designated B and connected through a remotely-operated normally-open contact K2 to a terminal 3. The contact K2 serves to disconnect the sharing circuit from a common bus, to be further described, when the charger is deenergized. The contact K2 is interlocked with the line contactor of the charger.

The voltage appearing between the slider of the potentiometer R13 and terminal 3 is adjustable but nevertheless proportional to the load current output of the charger generator CG. The polarity of the load-current-proportional but adjustable voltage between the slider of potentiometer 13 and the terminal 3 is such that terminal 3 is positive and the slider of the potentiometer is negative.

A variable resistor R58 connects the slider of potentiometer 13 to the base of an N-P-N transistor Q11. A resistor R59 connects the emitter of transistor Q11 to the negative output line LD2 of the charger generator CG and a resistor R60 connects the collector of transistor Q11 to the base of transistor Q2 in the charger generator CG. Elements R59, R60 and Q11 thus form a shunt path parallel to the resistor R3. The mid-tap of a voltage divider comprising adjustable resistor R26 and resistor R45 and connecting across the line LD2 and LD1, connects to the base of transistor Q11 to establish a potential across the resistor R45 and at the base of transistor Q11.

The biasing at the base renders transistor Q11 conductive, and because the base-to-emitter voltage of transistor Q11 is very small, that is to say in order of one-tenth of a volt, the voltages across resistors R45 and R59 are equal. The current flow through transistor Q11, resistor R59 and resistor R60, in parallel with the resistor R3, reduces the equivalent resistance afforded by the resistor R3 between the base of transistor Q2 and the negative line LD2. The resulting voltage drop across the resistor R3 being thereby reduced under steady state conditions requires setting of calibrating rheostat R1 of the charger CG to accommodate this change in voltage in order to restore the charger to the proper load voltage at the output terminals T1, T2.

With rheostat R1 thus adjusted, a voltage applied between terminal 3 and lead LD2 may increase the voltage across R45 by adding to the current flow which the voltage divider R45, R26 establishes in resistor R45. As a result, the voltage across resistor R59 rises, precipitating an increase in current through transistor Q11 and forcing an increase in the voltage output at the terminals T1, T2. Similarly, a voltage applied between terminal 3 and lead LD2 which opposes the current flow established in R45 by resistor R26 decreases the output voltage at terminals T1, T2.

Figure 2:
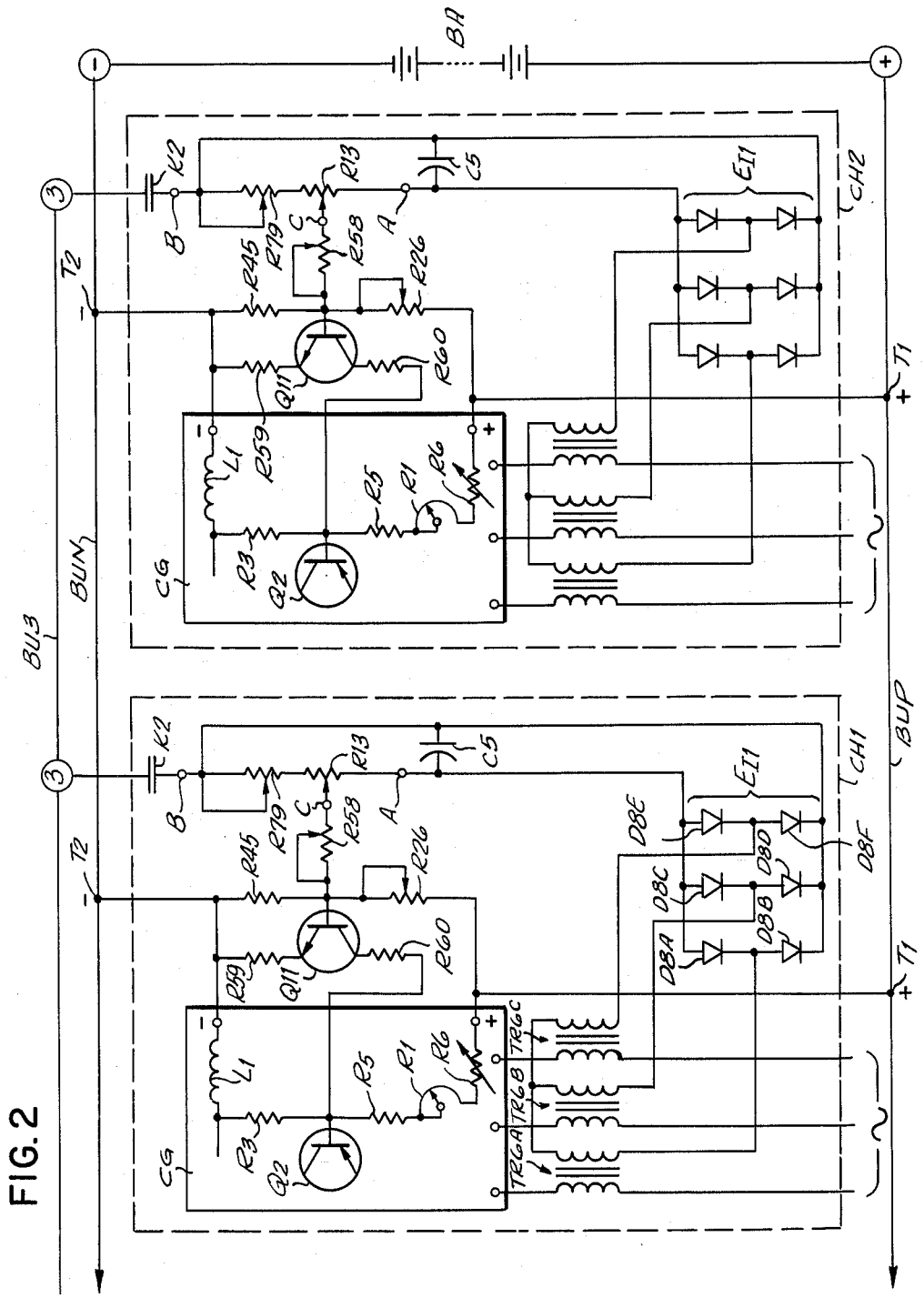
FIG. 2 is a simplified schematic diagram illustrating the control circuitry according to the invention as applied to two chargers connected in parallel.

FIG. 2 illustrates schematically the manner in which voltages appearing in other charger generators are connected to effect voltage changes across resistor R45 for the purpose of inducing load sharing. In FIG. 2 two chargers CH1 and CH2, each constituted by the circuit in FIG. 1 and including respective charger generators CG, possess respective positive and negative output terminals T1 and T2 connecting on the negative side to a bus BUN and on the positive side to a bus BUP. The buses BUP and BUN connect respectively to the positive and negative terminals of the battery BA to be charged and extend to other chargers CH3 and CH4 which the invention contemplates connecting in parallel with the chargers CH1 and CH2.

A bus BU3 connects together the terminals 3 of the chargers CH1 and CH2. This combination of common connection to the battery buses and common connection to the terminals 3 completes a circuit through which current may flow depending upon the voltage created across the current-proportional voltages and the load sharing circuits of chargers CH1 and CH2. Charger CH1 and charger CH2 are adjusted to share load current equally by setting potentiometers R13 at identical positions and applying similar bias at the resistors R45. If the chargers are sharing load current equally, the voltage output from the rectifier circuit D8A through D8F in each of the chargers, identified as voltage $E_{11}$, are equal, thereby producing equal voltages from one end of resistors R79 (point B) to the other end of resistors R13 (point A). Similarly the voltages between points B and the sliders of resistors R13 (point C) are equal. Therefore no current will flow through the terminals 3 or through the current-dividing circuit, and no differential current will flow through the resistors R45 in each charger. Some adjustment of resistors R45, R58 and R13 may be necessary to compensate for inherent differences in the components of each charger.

If, when connected across the battery bank BA, charger CH1 carries a greater current through its terminals T2 and T1 than the charger CH2, the potential across points C and B of charger CH1 will be greater than the corresponding potential C and B of charger CH2. Thus current flow will be initiated from point B in charger CH1 to terminal 3 of charger CH1 to terminal 3 of charger CH2 through resistor R79 of charger CH2 through the slider of potentiometer R13 of charger CH2, through resistor R58 of charger CH2, to resistor R45 of CH2 to the battery negative terminal of CH2 and then to the charger battery negative bus BUN of charger CH1. Current then continues flowing through R45 of charger CH1, through R58 of charger CH1 to the slider of potentiometer 13 of charger CH1 to resistor R79 of CH1. Such current flow under this condition opposes or causes a decrease in the total current through resistor R45 of charger CH1 and an increase in the total current through resistor R45 of charger CH2. The result is a decrease in voltage across resistor R45 of charger CH1 and an increase in the voltage across resistor R45 of charger CH2, thereby decreasing current through transistor Q11 of CH1 and simultaneously increasing the current through transistor Q11 of CH2. The decrease in current through transistor Q11 of CH1 reduces the excessive current flow in CH1 by reducing its output voltage somewhat. Simultaneously the increase in current through transistor Q11 of charger CH2 effects an increase in the voltage output of charger CH2 and tends to increase the current from this charger. The increase and decrease continue until the current output of chargers CH1 and CH2 are equal.

For accurate results the bias voltages established across the resistors R45 in CH1 and CH2 by adjustment of resistor R26 should be equal. When the bias voltage is not equal even if there exist identical voltages between points B and C in each unit the following will occur. Assuming that charger CH1 has a slightly greater bias than across resistor R45 than charger CH2, a current will flow from resistor R45 through slider of potentiometer R13 of CH1, through R79 of CH1 to terminal 3 of CH1, to terminal 3 of CH2 through R79 and R13 of CH2, through R45 of CH2 and back to R45 of CH1. The direction of this particular current flow causes a reduction in the voltage across resistor R45 of CH1 since the current flow is in opposition to the bias. There follows an increase in the voltage across R45 of charger CH2 so as to lower the voltage and current from charger CH1 and simultaneously raise the current from charger CH2. Thie differential current flow would result, because the difference in the bias voltage is established across the resistors R45. Resistor R58 adjusts the impedance in each charger thereby also adjusting the gain or current balance circuit in the separate chargers.

The chargers CH1, CH2 may be adjusted to afford current contribution in a given proportion by adjusting the members R26, R58, R23 and R79 until the desired proportion is achieved. Preferably the voltage at R13 should first be adjusted for a larger voltage when the unit is carrying a smaller percent of its rating. R58 and R79 are then adjusted to match impedances in the paralleled units.

In FIG. 3 the chargers CH1 and CH2 each correspond to the charger in FIG. 1 as well as the corresponding chargers CH1, CH2 in FIG. 2. The transformers TR6A and TR6C as well as the diodes D8 to D8F appear only as boxes thereby simplifying the schematic diagram of the individual chargers. A charger CH3 represents another self-regulating charger which does not necessarily have the same internal components as charger CH1 and CH2, but nevertheless possesses a feedback system for regulating its output voltage in response to the voltage existing at output terminals TP3, TN3. The negative output terminal TN3 and a positive output terminal TP3 respectively connect to buses BUN and BUP connecting the corresponding terminals for chargers CH1, CH2 and the battery BA to be charged. While the internal circuit of charger CH3 is not necessarily the same as in chargers CH1 and CH2, it includes or is externally and particularly provided with, direct voltage devices TA and DA corresponding in construction and function to elements TR6A to TR6C and D8A to D8F for responding to the current input, and hence current output, of the charger CH3 so as to provide a current-indicating direct-voltage $E_I$. Charger CH3 similarly possesses or is altered to provide a regulated-control-biasing voltage $Eb$ between its negative output terminal TN3 and an input point X on its feedback system circuit, corresponding in function to the voltage across R45 in chargers CH1 and CH2. The voltage $E_I$ in the charger CH3 corresponding to the voltage developed across resistors R79 and the slider of R13 which is proportional to the voltage input to charger CH3 is coupled electrically or magnetically between a terminal 3 and the point X.

As a final point the charger CH3 possesses, or is altered to furnish, between the negative terminal TN3 and the terminal 3 a resistance $Req$. The value of $Req$ should be within the range and possibly equal to the value of the equivalent resistance between the negative terminal of charger CH1 and terminal 3. Because the charger CH3 is the "unknown" or "other" charger, the values of $Req$, $E_I$ and $Eb$ may be fixed and not easily alterable. Thus the values of resistor R79, R13, R58 and R26, in a practical sense are set to correspond to the values $Req$, $E_I$ and $Eb$. However the reverse (i.e. adjusting $Req$, $Eb$ and $E_I$) is also contemplated by the invention.

With all the chargers having equivalent resistances between the respective negative buses and the respective terminals 3, and with all chargers having equivalent bias voltages, such as across resistor R45, and with the chargers having a computable gain when circulating current in either direction can influence the output voltage of the charger, any number of chargers can be connected in parallel and can be connected in load sharing arrangement. Load sharing will occur if the circulating current can influence the voltage of the chargers both to raise the voltage in one direction of current and to lower the voltage in the reverse direction of current flow.

According to my invention I adjust the resistances R13, R58 and R79 in chargers CH1 and CH2 to be equal to the equivalent resistance $Req$ of charger CH3. Selection and adjustment of resistor R13 also adjusts the voltages between the points C and B of chargers CH1 and CH2 to equal the voltage $E_I$ in charger CH3. In other words, the chargers CH1 and CH2 are first adapted to the charger CH3 by varying the slider on resistor R13 so that the value of $E_I$ the voltage between the points B and C in chargers CH1 and CH2 is equal to the value $E_I$ and the resistors R58, R13 and R79 are adjusted to equal the resistance of $Req$ which is measured in the charger CH3. This may require some back-and-forth adjustment until a satisfactory equivalence is obtained. The voltage across resistors R45 in CH1 and CH2 is adapted to the voltage $Eb$ by varying the resistors R26 in CH1 and CH2. The result then constrains the chargers to share the load current equally.

My invention contemplates operating the chargers CH1 and CH2 relative to the charger CH3 in such a manner that their output currents compared to the output current of the charger CH3 are in a predetermined proportion corresponding to their inherent ability to conduct current. This is accomplished by varying the value of resistor R13 and resistors R58, R79, R26 so that the voltage between C and B will constrain the chargers CH1 and CH2 to provide current in a predetermined proportion relative to the charger CH3.

In the foregoing description the circulating current flowing through the resistor R45 and forming the basis upon which the charger generators CG operate to adjust their current output for load sharing, no mention was made of current flowing partially through the resistor R26 and through the positive bus BUP of the chargers CH1, CH2. The amount of current flowing through the resistor R26 for practical circuits is essentially far less than the current flow through resistor R45. Typical values in actual systems effecting a battery voltage of, for example, 50 volts and a bias voltage (steady state with equal current) across the resistor R45 of, for example .75 volt, produce 49.25 volts across the resistor R26. Typical voltages between the terminals 3 and the negative bus BUN are 8 to 10 volts for full load currents of the chargers involved. These values are of course given only as an example because other values are possible.

In operation of these devices the chargers CH1 and CH2 are connected across the buses corresponding to the buses of the charger CH3, which is the "strange," "unknown," or "other" charger. The value Req in charger CH3 is determined by external measurement along with the values Eb and $E_I$. Variation of the resistors R13, R79 and R58 to correspond to the values Req, $E_I$ and Eb adjusts the chargers CH1 and CH2 to the charger CH3 so as to provide load sharing according to a predetermined pattern, for example equal load sharing by all the chargers.

One of the particular features of the present invention concerns the manner in which the feedback voltage from the output terminals or output leads of the voltage regulated device is varied according to the load sharing circuits. In the present circuit (see FIG. 1) the biasing resistor R3 is shunted by an N-P-N transistor Q11, resistor R59 and resistor R60 to vary the biasing voltage of the symmetrical or differential amplifier comprising transistors Q1 and Q2. As stated, of particular importance in this differential amplifier is the fact that transistor Q1 is biased by a steady state voltage between negative lead LD2, connected to the collector of transistors Q1 and Q2 and the base of transistor Q1. This manner of connection affords permitting a wide variation of voltages across the leads LD1 and LD2 without subjecting the transistors Q1 and Q2 to excessive burn-out voltages. This is so because if a surge voltage appears across the leads LD1 and LD2 the base voltage of transistors Q1 and Q2 will approach the voltage at lead LD2 as determined by the diodes D3A, D3B and D5 of the lead LD2 producing heavy conduction in transistor Q1 and emitter resistor R7. This causes the emitters of the transistor also to approach the voltage of the collectors. Since the emitter voltages approach the collector voltages most of the voltage surge across the lines LD1 and LD2 appears across the resistor R7 rather than across the transistors Q1 and Q2. Even if transistors Q1 and Q2 are saturated by the resulting current surge, it will be evident that the transistors will not be harmed. This is because the transistors are capable of handling a heavy current load when turned full on but only a small voltage across the junctions. Thus an otherwise dangerous voltage surge across two transistors is transformed into a harmless current surge.

While various embodiments of the invention have been described in detail, it will be obvious to those skilled in the art that the invention may be otherwise embodied without departing from the spirit and scope of my invention as set forth in the following claims.

I claim:

1. For a system of charging generators connected in parallel to energize a battery in a telephone exchange system, a charging generator comprising alternating current input leads, direct current output leads, rectifier means connecting said input leads and said output leads, control means having an input circuit connected to the output leads and an output circuit connected to said rectifier means for adjusting the voltage between the output leads, current transformer means connected in said input leads, diode means connected to said current transformer means for rectifying the voltage output of said current transformer means, and an impedance network connected to said diode means for establishing a voltage corresponding to the current in said input leads, circuit means connecting said impedance means at one end to said input circuit of said control means, and terminal means connecting the other end of said impedance means and adapted to connect to similar terminal means on another charging generator having similar control means and corresponding impedance means and connected to the same battery load so as to establish a common circuit between the impedance means of both of said charging generators whereby said charging generators will constrain each other to share the load current.

2. For a system of charging generators connected in parallel to energize a battery in a telephone exchange system, a charging generator comprising alternating current input leads, direct current output leads, rectifier means connecting said input leads and said output leads, control means having an input circuit connected to the output leads on an output circuit connected to said rectifier means for adjusting the voltage between the output leads, current transformer means connected in said input leads, diode means connected to said current transformer means for rectifying the voltage output of said current transformer means, and an impedance network connected to said diode means for establishing at said input circuit of said control means a voltage corresponding to the current in said input leads, a terminal, circuit means connecting one side of the voltage at said impedance means to one of said output leads and connecting the other side of the voltage at said impedance means to the terminal, said terminal being adapted to connect to a corresponding terminal in another charging generator having similar control means and corresponding impedance means and circuit means so as to connect said circuit means and said circuit means of both charging generators into a common circuit constraining said charging generators to share the load current in predetermined proportions.

3. A circuit for constraining current supply in a predetermined ratio from two parallel connected rectifiers, comprising respective voltage means connected to each rectifier for responding to their respective input currents and including a transformer and diode, impedance means connecting said voltage means to each other in voltage opposition and including two biasing means each having a transistor and being connected to one rectifier for changing its output voltage in response to currents flowing between said voltage means, said impedance means and said biasing means including variable resistors adjustable to values wherein no current flows between said voltage means when the rectifiers supply current in the predetermined ratio.

References Cited by the Examiner

UNITED STATES PATENTS

| | | | |
|---|---|---|---|
| 2,859,356 | 11/1958 | King | 307—84 X |
| 2,882,422 | 4/1959 | Cohen | 307—57 |
| 2,972,058 | 2/1961 | Kahle | 307—57 |
| 3,022,427 | 2/1962 | Jensen | 307—57 |

LLOYD McCOLLUM, *Primary Examiner.*

RICHARD C. SIMS, *Examiner.*